United States Patent [19]
Porter

[11] 3,799,105
[45] Mar. 26, 1974

[54] APPARATUS FOR PROTECTING AGRICULTURAL CROPS FROM PESTS

[76] Inventor: Earl C. Porter, Princeton Ct., Box 63, 38 W. Prince Rd., Tucson, Ariz. 85705

[22] Filed: Sept. 2, 1971

[21] Appl. No.: 177,899

[52] U.S. Cl.................. 116/22 A, 46/52, 116/67 R
[51] Int. Cl. ............................................. G08b 9/00
[58] Field of Search............ 116/22 A, 67 R, 114 R; 119/29; 46/52, 77; 56/29

[56] References Cited
UNITED STATES PATENTS

| | | | |
|---|---|---|---|
| 305,079 | 9/1884 | Jones | 46/52 |
| 680,703 | 8/1901 | Devaney | 46/52 |
| 1,167,502 | 1/1916 | Huffman et al. | 116/22 A |
| 2,685,283 | 8/1954 | Bucklin | 46/77 X |
| 2,788,762 | 4/1957 | Wright | 116/22 A |
| 3,107,452 | 10/1963 | Berger | 46/77 |
| 3,424,132 | 1/1969 | Fischer et al. | 119/29 |

FOREIGN PATENTS OR APPLICATIONS

| | | | |
|---|---|---|---|
| 822,220 | 9/1937 | France | 116/22 A |

Primary Examiner—Louis J. Capozi

[57] ABSTRACT

A dynamic apparatus for establishing sight and sound stimuli patterns that are contiguous to agricultural crops, which patterns are generally avoided by crop pests. A rotary structure, which is supported for movement about a generally vertical axis, carries a plurality of weighted lines that are revolved (extended by centrifugal force) to provide the stimuli patterns. The lines as disclosed carry sound-producing weights and the apparatus includes a control means for varying the lengths of the lines extending from the rotary structure. Specifically, the lines may be controlled to be: fully retracted when the apparatus is being started, extended while the apparatus is rotating, retracted while the apparatus is being stopped and oscillated while the apparatus is in operation. Such movements are accomplished by a motor that is supported on the rotor along with a plurality of spools for receiving and dispensing the lines.

5 Claims, 4 Drawing Figures

PATENTED MAR 26 1974 3,799,105
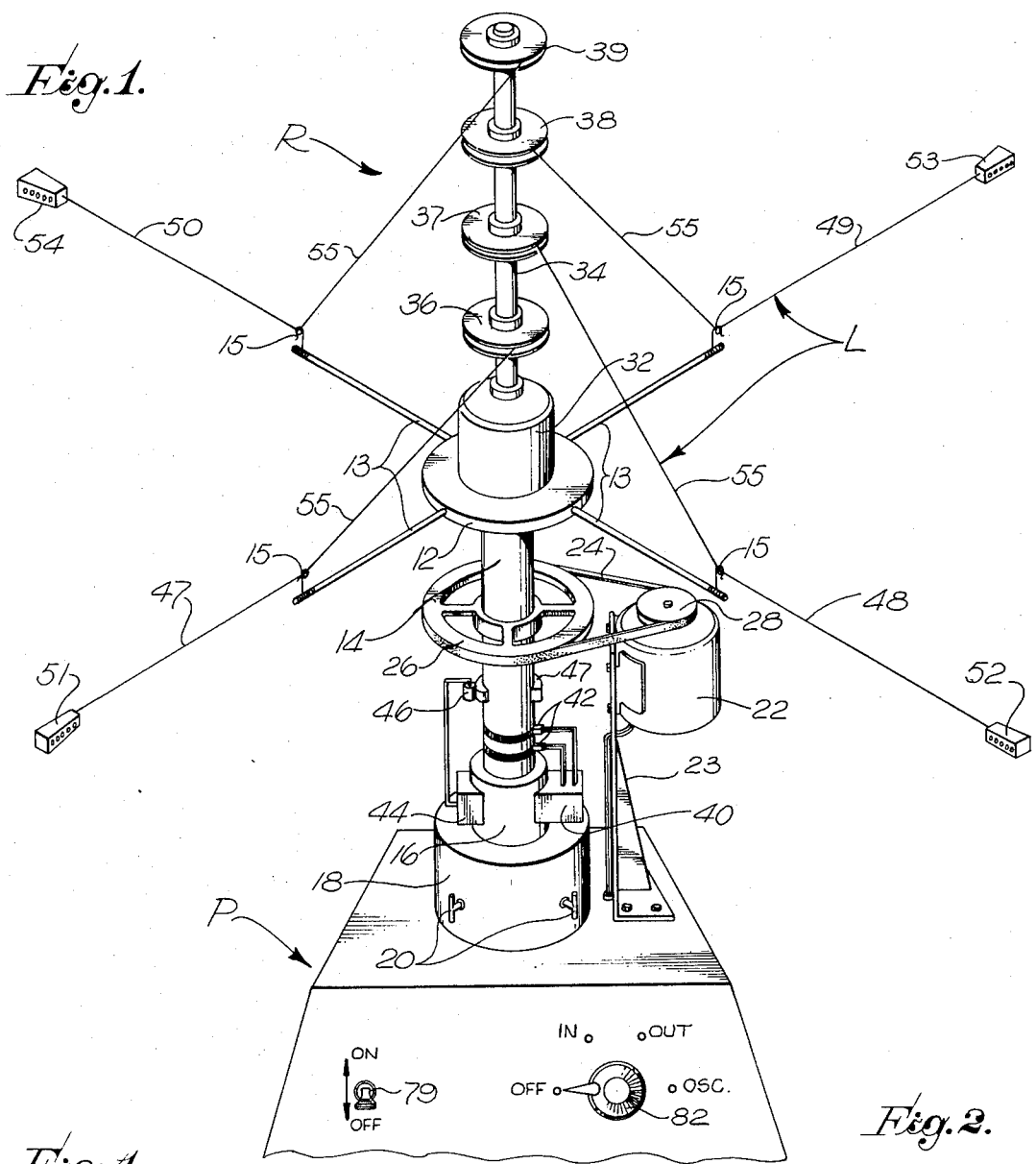
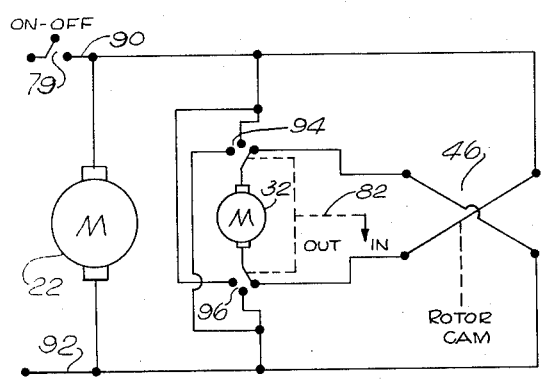
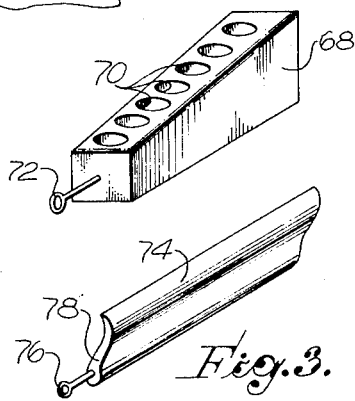

APPARATUS FOR PROTECTING AGRICULTURAL CROPS FROM PESTS

BACKGROUND AND SUMMARY OF THE INVENTION

The protection of agricultural crops from various pests is an age-old problem, and over the years various approaches have been taken. However, for some time, tendencies generally favored the application of chemical compounds that are repugnant or poisonous to those pests of primary concern. Generally, various chemical compositions have been employed, depending on the crops to be protected and the pests of concern. Of course, the chemical compounds may be variously dispensed, however, repeated applications are usually required and consequently substantial costs are often encountered. However, in using such chemicals, undesirable side effects are frequently of greater concern than economic aspects. Specifically, chemical compounds used on crops are: sometimes toxic to humans, may alter certain balances of nature and have even detrimentally effected the crops of concern. Furthermore, experience has revealed that chemical compounds may be used for many years before the full consequences of their detrimental effects are fully known. Accordingly, in recent years, a need has been recognized for improved methods, techniques or apparatus for protecting agricultural crops from various pests without widespread use of chemical deterrents.

In general, the present invention contemplates a mechanical apparatus which may be relatively inexpensively constructed, and economically used to provide vibratory patterns of motion, sound and air-pressure, which are instinctively avoided by many agricultural-crop pests. Specifically, the structure hereof moves elongated, weighted lines above agricultural crops to establish the desired stimuli patterns. Such patterns result from the rotating lines in combination with sound-producing weights terminating such lines. Starting and stopping the apparatus is afforded by controls to shorten and elongate the extending lines.

BRIEF DESCRIPTION OF THE DRAWINGS

In the drawings, which constitute a part of this specification, an exemplary embodiment demonstrating various objectives and features hereof is set forth as follows:

FIG. 1 is a perspective view of an apparatus constructed in accordance with the present invention;

FIG. 2 is a perspective view of one form of weight employed in the system of FIG. 1;

FIG. 3 is a perspective view of another form of weight which may be employed in the structure of FIG. 1; and FIG. 4 is a schematic diagram of the electrical system incorporated in the apparatus of FIG. 1 for control and drive purposes.

DESCRIPTION OF THE ILLUSTRATIVE EMBODIMENT

As required, a detailed illustrative embodiment of the invention is disclosed herein. However, it is to be understood that the embodiment merely exemplifies the invention which may take many forms that are different from the specific illustrative embodiment disclosed herein. Therefore, specific structural and functional details disclosed herein are not to be interpreted as limiting, but merely as a basis for the claims defining the scope and content of the invention.

Referring initially to FIG. 1, a rotor R is shown carrying radially-extending flexible lines L and supported upon a pedestal P. Generally, in the operation of the structure, the rotor R turns at a speed that is adequate to provide centrifugal forces to maintain the lines L substantially horizontal as they move above agricultural crops (below the pedestal P). The motion patterns of the lines L, along with sonic and atmospheric patterns resulting from the movement of the lines L tend to discourage various agricultural pests; yet these stimuli patterns are not particularly offensive to humans nor do they have any lasting adverse environmental effects.

Considering the system of FIG. 1 in greater detail, the rotor R includes a platform 12 (mid-section) which is concentrically affixed to a drive shaft 14 that is supported by the pedestal P. The platform 12 holds four radially extending rods 13 each of which carries a line loop or eye 15 affixed at its end, to pass a line. Below the platform 12, the lower end (not shown) of the drive shaft 14 is received in a vertical bearing 16 which is in turn telescopically received in a support sleeve 18. The support sleeve 18 is carried on the pedestal P and incorporates locking devices 20 for engaging the bearing 16 within the sleeve 18.

The pedestal P incorporates electrical-power elements (not shown) through which energy is supplied to a main drive motor 22 that is affixed to the pedestal P by a support bracket 23. The motor 22, which may be as described beginning on page 8–39 in the book entitled Electrical Engineers Handbook, published 1949 by John Wiley and Sons, is connected through a horizontal belt drive 24 to the drive shaft 14 to revolve the rotor R. Generally, in the specific design as illustrated, a pulley 28 (carried by the motor 22) is somewhat smaller than a pulley 26 which is concentrically affixed to the drive shaft 14. Accordingly, the belt 24 (carried on the pulleys 26 and 28) turns the rotor R at a substantially slower speed than that of the motor 22.

The rotor R incorporating the shaft 14 also includes a line-control motor 32 which may be similar to the motor 22, and which is supported on the platform 12. The shaft 34 of the motor 32 carries four spools 36, 37, 38 and 39 for storing unused portions of the lines L. The motor 32 is energized through a power box 40 affixed to the bearing 16. Contacts 42 emerge from the box 40 to engage insulated contact rings 42 on the drive shaft 14. Electrical connectors (not shown) pass from the rings 42, internally through the shaft 14 to the motor 32. Another electrical box 44 is also affixed to the sleeve 18 and provides a switch 46 which is a reversing switch as disclosed in detail below and which is actuated by a semi-cylindrical cam 47.

Returning to further consider the rotor R, the spools 36, 37, 38 and 39 each carry a reserve coil which is continuous with extending line portions 47, 48, 49 and 50, which comprise the lines L. The extending portions 47, 48, 49 and 50 are terminated by attached sound-producing weights 51, 52, 53 and 54 respectively. Inwardly from the weights 51, 52, 53 and 54, the extending line portions 47, 48, 49 and 50 pass through the eyes 15 individually and continue as connection sections 55 to the coils on the spools 36, 37, 38 and 39.

The apparatus hereof may be variously constructed utilizing various mechanical and electrical techniques.

Additionally, various forms of lines and sound-producing weights may be employed, some of which are described in detail below. HOwever, generally, relatively-flexible mono-filament lines have been found quite satisfactory and the effective revolution thereof requires relatively little energy.

The sound-producing weights may vary depending upon various design parameters and the nature of the pests of greatest concern. One form of the weights is illustrated in FIG. 2 and consists of a block 68 of metal, plastic, wood or various other materials of somewhat irregular configuration and defining a plurality of bores 70 of varying length therethrough. An eyelet 72 is affixed at one end of the block 68 for fastening it to the end of a line.

In an alternative form, the sound-producing weights may comprise a vane as depicted in FIG. 3 and including a sheet 74 of tapering thickness having an eyelet 76 affixed at one end and incorporating arcuate curvature 78 to accomplish various movement patterns. Generally, as the vane of FIG. 3 moves through the air, oscillations are established which intensify the stiumli patterns afforded by the primary apparatus.

Considering the overall operation of the system, controls are provided on the pedestal P. Specifically, an "on-off" toggle switch 79 controls the main power, including the primary drive motor 22. A rotary switch 82 controls the motor 32.

The system might be used in a somewhat typical cycle by starting with the lines L short, i.e., the primary lengths of line being borne on the reels 36, 37, 38 and 39, with the extending portions 47, 48, 49 and 50 relatively short. Initially, the "on-off" switch 79 is actuated to an "on" position and the rotary switch 82 is set to the left, energizing the motor 32 to unreel lines thereby enlarging the extended portions 47, 48, 49 and 50. When the desired length of line is extended, from the rotor R, the switch 82 may be set to the center position or set to command oscillations. If oscillations are commanded, the cam 47 (FIG. 1) actuates the switch 46 to reverse the motor 32 in an oscillating pattern so that the line is alternately elongated and shortened.

With the unit in operation, the rotating lines produce patterns of sound, motion and air pressure that have a frightening effect on birds, animals and insects. Various operating parameters may produce different results and in that regard variations are to be considered in: operating height, speed of rotation, length of lines, types of weights, and so on. Although the possibilities have not been exhausted, tests indicate good results with regard to birds and large winged insects, using a wide range of parameters.

In using the apparatus, certain time cycles may be developed for specific crops and specific pests whereby operation can be rather limited. Of course, automatic control is contemplated and can be provided in economically-feasible installations.

In using the manuals controls as provided in the illustrative embodiment, the switch 82 is first turned to the "in" position, energizing the motor 32 to turn the spools 36, 37, 38 and 39 in a counter clockwise direction to draw in the lines L. Subsequently, when the extended portions 47, 48, 49 and 50 are sufficiently short, the "on-off" switch 79 can be actuated to stop the motor 22.

The electrical system, as utilized to accomplish the control operations described above is housed in the pedestal P and incorporates the motors 22 and 32, the switches 46, 79, and 82 along with a control circuit as will now be considered. The individual electrical components as represented in FIG. 4 bear similar indentification numerals to their physical representations in FIG. 1. The motor 22 is connected between power busses 90 and 92 which are energized through the on-off switch 79. Also connected between the busses 90 and 92 are the contact sets 94 and 96 of the switch 82 with the motor 32 there between. Specifically, the left stationary contacts of each set are open for the "off" position. In the next pair of stationary contacts, the buss 90 is connected to one of the contacts in set 94 and one in the set 96 while the buss 92 is connected to opposed contacts in each set 94 and 96. Thus, rotation of the motor 32 is commanded in either direction to let the lines out or draw them in. Finally, the right stationary contacts in each set 94 and 96 are connected to the busses 90 and 92 through the reversing switch 46 so that depending upon its position, the motor 32 is energized to revolve in either direction. As previously described, and as indicated in FIG. 4, the reversing switch 46 is controlled by the cam action of the rotor. Accordingly, with each half rotation thereof the motor M is energized to turn in a different direction thereby alternatingly lengthening and shortening the extending portions 47, 48, 49 and 50 of the lines L.

Having thus described the system hereof with respect to the figures and presented various exemplary details thereof with regard to certain forms, it will be apparent that adaptions and modifications can be readily accomplished. Accordingly, the scope hereof shall be determined in accordance with the claims as set forth below.

I claim:

1. An apparatus for protecting agricultural crops for pests, comprising:
   a support means for providing a stable support adjacent said crops;
   a rotor means affixed on said support means, said rotor means including a rotary member for rotating with respect to said support means;
   at least one line;
   at least one line control means attached to said line and affixed to said rotary member and including means for withdrawing and extending a free flexible length of said line from said rotary member; and
   motive means coupled to said rotary member for driving said rotary member to provide centrifugal forces on said free flexible length of said line whereby to support said free flexible length of line vertically in moving above said crops.

2. An apparatus according to claim 1 wherein said line control means includes a spool means, said line being carried on said spool means, and further including means for actuating said spool means for winding and unwinding said line from said spool means.

3. An apparatus according to claim 2, further including control means for cyclically operating said line control means for actuating said spool means to periodically reverse said spool means whereby to continuously wind and unwind line.

4. An apparatus according to claim 1, including a pair of said line control means each for providing a variable length of free line extending in diametrically opposed directions from said rotary member.

5. An apparatus according to claim 1, further including a sound-producing weight affixed to said length of line.

* * * * *